United States Patent
Ahmad et al.

(10) Patent No.: US 11,368,344 B2
(45) Date of Patent: Jun. 21, 2022

(54) METHOD AND APPARATUS HAVING A SYNCHRONIZATION SIGNAL SEQUENCE STRUCTURE FOR LOW COMPLEXITY CELL DETECTION

(71) Applicant: Motorola Mobility LLC, Chicago, IL (US)

(72) Inventors: Ziad Ahmad, Chicago, IL (US); Hyejung Jung, Palatine, IL (US); Vijay Nangia, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 489 days.

(21) Appl. No.: 15/922,323

(22) Filed: Mar. 15, 2018

(65) Prior Publication Data

US 2018/0270095 A1 Sep. 20, 2018

Related U.S. Application Data

(60) Provisional application No. 62/471,747, filed on Mar. 15, 2017.

(51) Int. Cl.
*H04L 27/26* (2006.01)
*H04J 13/00* (2011.01)
(Continued)

(52) U.S. Cl.
CPC ...... *H04L 27/2613* (2013.01); *H04J 11/0073* (2013.01); *H04J 13/0062* (2013.01);
(Continued)

(58) Field of Classification Search
CPC ............... H04L 5/0051; H04L 27/2675; H04J 11/0073; H04J 11/0069; H04W 56/001
See application file for complete search history.

(56) References Cited

U.S. PATENT DOCUMENTS

2008/0232238 A1* 9/2008 Agee ............... H04B 7/0413
370/208
2015/0124579 A1* 5/2015 Sartori ............... H04J 11/00
370/210
(Continued)

FOREIGN PATENT DOCUMENTS

WO 2016049270 A2 3/2016

OTHER PUBLICATIONS

3GPP ETSI TS 136.211, V13.0.0 (Year: 2016).*
(Continued)

*Primary Examiner* — Un C Cho
*Assistant Examiner* — Peter K Mak
(74) *Attorney, Agent, or Firm* — Loppnow & Chapa

(57) ABSTRACT

A method and apparatus having a synchronization signal sequence structure for low complexity cell detection is provided. The method includes establishing a set of a plurality of synchronization signal sequences to be used in connection with a communication target. Each one of the plurality of synchronization signal sequences includes at least a first sub-sequence, which includes either a first preselected sequence or a complex conjugate of the first preselected sequence, and a second sub-sequence, which includes either a second preselected sequence or a complex conjugate of the second preselected sequence. The second preselected sequence is different than the first preselected sequence, and is different than the complex conjugate of the first preselected sequence. Further, a length of the first sub-sequence and a length of the second sub-sequence are smaller than a length of the synchronization signal sequence. A signal including a synchronization signal is then received, where the synchronization signal comprises one of the synchronization signal sequences from the set of the plural- (Continued)

ity of synchronization signal sequences, and the synchronization signal is then detected.

20 Claims, 8 Drawing Sheets

(51) Int. Cl.
   *H04W 56/00* (2009.01)
   *H04J 13/10* (2011.01)
   *H04L 5/00* (2006.01)
   *H04J 11/00* (2006.01)

(52) U.S. Cl.
   CPC ............ *H04J 13/107* (2013.01); *H04L 5/005* (2013.01); *H04L 27/2692* (2013.01); *H04W 56/0015* (2013.01); *H04L 27/2684* (2013.01)

(56) References Cited

U.S. PATENT DOCUMENTS

| | | | | |
|---|---|---|---|---|
| 2016/0183170 | A1* | 6/2016 | Pu | H04W 48/16 455/434 |
| 2018/0139084 | A1 | 5/2018 | Jung et al. | |
| 2018/0219701 | A1* | 8/2018 | Seo | H04J 11/00 |
| 2018/0248680 | A1* | 8/2018 | Ji | H04J 11/0069 |
| 2018/0278355 | A1* | 9/2018 | Shin | H04L 27/2613 |
| 2018/0294910 | A1* | 10/2018 | Kim | H04L 27/266 |
| 2018/0295604 | A1* | 10/2018 | Wang | H04W 48/16 |
| 2018/0309611 | A1* | 10/2018 | Ko | H04J 11/0073 |
| 2019/0028984 | A1* | 1/2019 | Lee | H04L 27/2613 |
| 2019/0109664 | A1* | 4/2019 | Sadiq | H04J 11/0073 |

OTHER PUBLICATIONS

PCT International Search Report for PCT/US2018/022752, Motorola Mobility LLC, dated May 16, 2018.

Motorola Mobility et al., "Numerology and structure for NR synchronization signal", R1-1703043, for#GPP TSG RAN WG1 Meeting #88, Athens, Greece, Feb. 13-17, 2017.

Qualcomm Incorporated, "Synchronization signal sequence design consideration", R1-1700787, for 3GPP TSG-RAN NR AdHoc, Spokane, USA, Jan. 16-20, 2017.

Kapseok Chang et al., "Signal Design for Reduced Complexity and Accurate Cell Search/Synchronization in OFDM-Based Cellular Systems", IEEE Transactions on Vehicular Technology, vol. 60, No. 9, pp. 4170-4175, Nov. 2012.

* cited by examiner

METHOD AND APPARATUS HAVING A SYNCHRONIZATION SIGNAL SEQUENCE STRUCTURE FOR LOW COMPLEXITY CELL DETECTION

FIELD OF THE INVENTION

The present disclosure is directed to a method and apparatus having synchronization signal sequence structure for low complexity cell detection, and more particularly, a synchronization signal sequence structure, where each one of an established set of synchronization signal sequences includes a first and a second sub-sequence formed from a respective preselected sequence or a complex conjugate of the preselected sequence.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

While operating within a network, the standard will define the manner in which the user equipment communicates with the network including initiating a new connection or refreshing an existing connection that has somehow become stale, such as for example where synchronization between the user equipment and the network access point has been lost.

As part of a low level acquisition process, when attempting to initiate a connection to a network having a cellular structure, the user equipment can at least sometimes attempt to discover and acquire signaling from each of the nearby cells. This can involve receiving corresponding synchronization signals, which can include a respective primary and a respective secondary synchronization signal. In LTE, acquisition of a primary synchronization signal is initially attempted from which symbol timing and a partial cell identification can be determined. Various determinations of cross-correlations relative to a received signal with each of a predetermined set of synchronization signals can be used to determine the likely partial cell identification, such as the physical layer identity. Further more detailed information can then be determined through a subsequent acquisition of a secondary synchronization signal, including the frame timing, the rest of the cell identity, as well as other potential communication details, such as transmission mode and/or cyclic prefix duration.

The present inventors have recognized, that the manner in which the predetermined set of synchronization signals are formulated can determine the relative ease with which the synchronization signal can be received and detected. By including multiple different sub-sequences in each of the plurality of synchronization signal sequences, where each of the sub-sequences for the different synchronization signals are alternatively formed using a particular sequence or its related complex conjugate, the complexity of cell detection can be reduced.

SUMMARY

Presently, user equipment, such as wireless communication devices, communicate with other communication devices using wireless signals. According to a possible embodiment, a method in a user equipment is provided. The method includes establishing a set of a plurality of synchronization signal sequences to be used in connection with a communication target. Each one of the plurality of synchronization signal sequences includes at least a first sub-sequence, which includes either a first preselected sequence or a complex conjugate of the first preselected sequence, and a second sub-sequence, which includes either a second preselected sequence or a complex conjugate of the second preselected sequence. The second preselected sequence is different than the first preselected sequence, and is different than the complex conjugate of the first preselected sequence. Further, a length of the first sub-sequence and a length of the second sub-sequence are smaller than a length of the synchronization signal sequence. A signal including a synchronization signal is then received, where the synchronization signal comprises one of the synchronization signal sequences from the set of the plurality of synchronization signal sequences, and the synchronization signal is then detected.

In some embodiments, detecting the synchronization signal can include computing cross-correlations between the received signal and the set of the plurality of synchronization signal sequences. In some of these instances, computing cross-correlations can include computing multiplications to calculate cross-correlations between the received signal and the set of the plurality of synchronization signal sequences, wherein the multiplications are at least in part based on multiplications of the received signal with a first portion of each respective one of the plurality of synchronization signal sequences in the set, which corresponds to the first preselected sequence, and multiplications of the received signal with a second portion of each respective one of the plurality of synchronization signal sequences in the set, which corresponds to the second preselected sequence.

In some embodiments, a first one of the synchronization signal sequences from the set of the plurality of synchronization signal sequences can comprise the first sub-sequence being transmitted in a first set of subcarriers of a synchronization signal transmission band, and the second sub-sequence being transmitted in a second set of subcarriers of the synchronization signal transmission band.

According to another possible embodiment, a user equipment in a communication network including a communication target from which a synchronization signal can be received is provided. The user equipment includes a controller that establishes a set of a plurality of synchronization signal sequences to be used with the communication target. Each one of the plurality of synchronization signal sequences includes at least a first sub-sequence, which includes either a first preselected sequence or a complex conjugate of the first preselected sequence, and a second sub-sequence, which includes either a second preselected sequence or a complex conjugate of the second preselected sequence. The second preselected sequence is different than the first preselected sequence, and is different than the complex conjugate of the first preselected sequence. A length of the first sub-sequence and a length of the second sub-sequence are smaller than a length of the synchronization signal sequence. The user equipment further includes a transceiver that receives a signal including a synchronization signal, where the synchronization signal comprises one of the synchronization signal sequences from the set of the plurality of synchronization signal sequences. The controller further detects the synchronization signal.

According to another possible embodiment, a method in a network entity is provided. The method includes establishing a set of a plurality of synchronization signal sequences to be used in connection with a communication target. Each one of the plurality of synchronization signal sequences includes at least a first sub-sequence, which includes either a first preselected sequence or a complex conjugate of the first preselected sequence, and a second sub-sequence, which includes either a second preselected sequence or a complex conjugate of the second preselected sequence. The second preselected sequence is different than the first preselected sequence, and is different than the complex conjugate of the first preselected sequence. Further, a length of the first sub-sequence and a length of the second sub-sequence are smaller than a length of the synchronization signal sequence. A signal including a synchronization signal is then transmitted, where the synchronization signal comprises one of the synchronization signal sequences from the set of the plurality of synchronization signal sequences.

According to another possible embodiment, a network entity in a communication network including one or more communication targets to which a synchronization signal can be transmitted is provided. The network entity includes a controller that establishes a set of a plurality of synchronization signal sequences to be used with the communication target. Each one of the plurality of synchronization signal sequences includes at least a first sub-sequence, which includes either a first preselected sequence or a complex conjugate of the first preselected sequence, and a second sub-sequence, which includes either a second preselected sequence or a complex conjugate of the second preselected sequence. The second preselected sequence is different than the first preselected sequence, and is different than the complex conjugate of the first preselected sequence. A length of the first sub-sequence and a length of the second sub-sequence are smaller than a length of the synchronization signal sequence. The network entity further includes a transceiver that transmits a signal including a synchronization signal, where the synchronization signal comprises one of the synchronization signal sequences from the set of the plurality of synchronization signal sequences.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
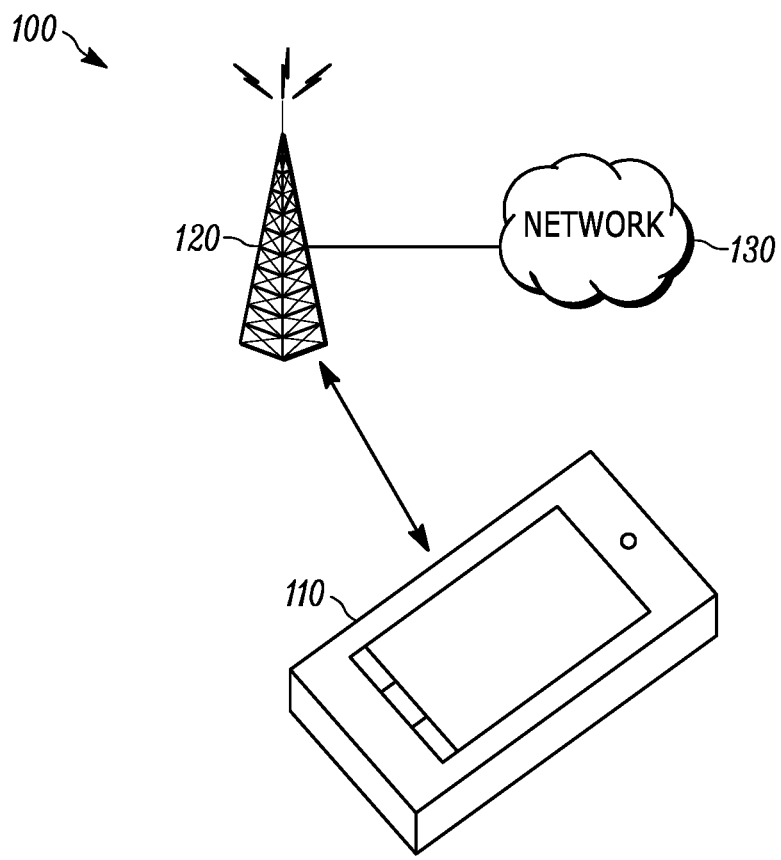
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for synchronization signal sequences for low complexity cell detection.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In the fifth generation (5G) radio access technology (RAT), the bandwidth of the synchronization signal (SS) is expected to be multiple times larger than in LTE. Such an increase in the bandwidth of SS could allow for the use of longer SS sequences, which may result in faster and more robust cell identification at a user equipment (UE) and enhanced time and frequency synchronization between a base station (BS) and the UE.

However, using longer sequences for the primary synchronization signal (PSS), such as Zadoff-Chu (ZC) sequences, itself may not necessarily provide significant performance improvement, such as in the presence of carrier frequency offset (CFO). In addition, defining more than one PSS sequence (e.g., each PSS sequence indicates partial cell ID information) together with using longer sequences for PSS (than those used in LTE) could meaningfully increase the UE cell detection complexity (due to multiple candidate PSS sequences and increased number of required multiplications per candidate PSS sequence when computing cross-correlation) if the PSS sequences are not designed with specific complexity-reducing structure.

In accordance with the present application, a structure for the generation of long PSS sequences is presented. The proposed long PSS sequence structure features improvements in synchronization performance over shorter sequences, while keeping the UE detection complexity low compared to a single long sequence.

In at least some instances involving a synchronization signal for diverse communication devices, a multi-sequence concatenation based SS structure which allows UEs with different receiver bandwidths to perform cell detection and synchronization has been disclosed. However, in these instances, it has generally not been disclosed how to select sub-sequences of the concatenation based PSS for generating a set of long PSS sequences which, in the presence of frequency offset, have good auto-correlation and cross-correlation performances as well as allow low detection complexity at UE.

According to a possible embodiment, the OFDM subcarrier spacing (SCS) of SS may be frequency band-specific. For a given OFDM subcarrier spacing (SCS) of SS in a given frequency band, the SS bandwidth can be defined as an integer multiple of SCS, i.e. W=L×SCS, where L is a positive integer. The SS bandwidth can be considered to span L OFDM subcarriers. Then, the length of the SS sequence can be N, where N is a positive integer such that N≤L. We define a basic sequence length $N_B$, and the SS sequence length N, which in at least one possible embodiment is an integer multiple of the basic sequence length, such as given by $N=m \times N_B$ where m is a positive integer. In another embodiment, the SS sequence length may not exactly be an integer multiple of the basic sequence length. For example, the SS sequence may be based on a truncation or a cyclic extension of an SS sequence with a length being an integer multiple of the basic sequence length. In another embodiment, one or more of the SS sequence elements may be punctured (set to value of 0). In another embodiment, the mapping of the SS sequence to the L subcarriers of the SS may include guard subcarriers between one or more of the m basic SS sequence, and/or guard subcarriers towards the band edges of the SS bandwidth. The reason behind introducing $N_B$ will be apparent shortly.

Figure 2:
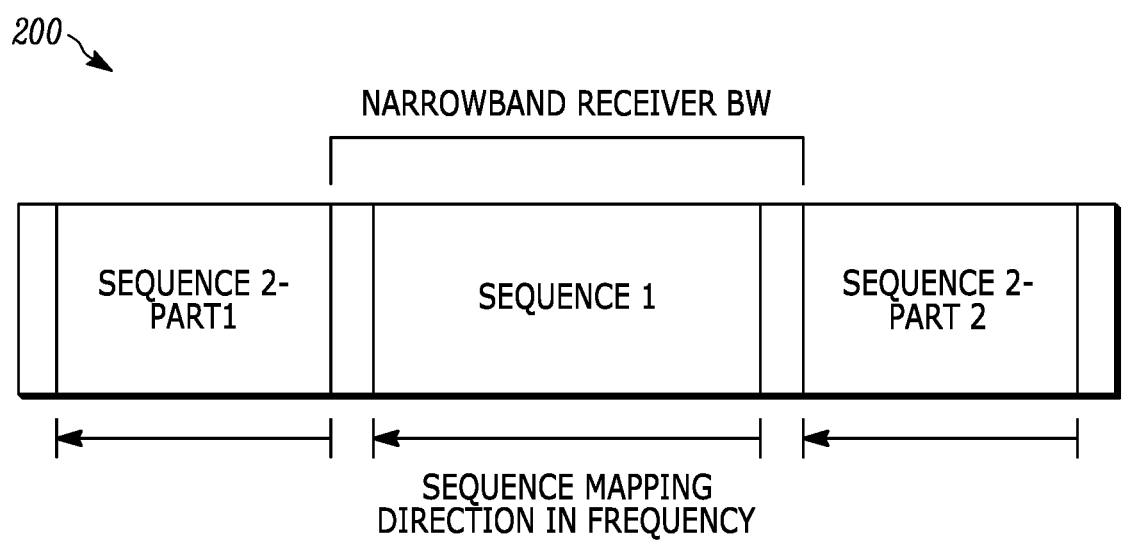
FIG. 2 is a construction of a primary synchronization signal using concatenation of two shorter sequences.

With the potential maximum length of L for PSS, and assuming three PSS sequences as in LTE to convey partial physical-layer cell identity (ID) information, such as a physical-layer identity within the physical-layer cell-identity group, one possible design is to generate three PSS sequences each as a ZC sequence of length L. However, using longer sequences (L>63, where 63 is the ZC sequence length in LTE) could meaningfully increase the UE detection complexity and in fact may not provide the expected enhancement in detection performance over shorter sequences, such as in the presence of CFO. Alternatively, one can construct each PSS sequence as a concatenation of m shorter ZC sequences each of length $N_B$. In one example, m=2. Between each of the shorter sequences, a few subcarriers can be left unoccupied to serve as guard subcarriers. Guard subcarriers allow for possible extraction of the shorter sequence, which can be used for synchronization by UEs equipped with a narrowband receiver. One possible concatenation structure 200 is shown in FIG. 2. Note that m shorter sequences of length $N_B$ are not limited to ZC sequences but can include other types of sequences such as m-sequences. Furthermore, secondary synchronization signal (SSS) sequences can also be constructed and mapped in the frequency domain as described above.

In one embodiment, a UE receives SS carrying a SS sequence of length N, where the SS sequence consists of m shorter sequences of length $N_B$ and one or more shorter sequences out of the m shorter sequences have punctured (i.e. zeroed-out by a transmitter) sequence elements. In one example, puncturing is applied to one or more shorter sequences received by wideband UEs. In one example, the shorter sequence with puncturing may be considered as a truncation of the shorter sequence. The punctured elements can provide enough guard band for narrowband UE receiver operation without increasing the overall PSS transmission bandwidth (or the total number of subcarriers used for PSS including guard subcarriers). Further, the use of punctured (or in some examples equivalently truncated) sequences can make the total number of subcarriers for PSS close to one of radix-2 fast Fourier transform (FFT) sizes or close to an integer power of 2 number. This can be beneficial since wideband UE can perform cross-correlation operation with a desired received signal sampling rate of the integer multiple or submultiple of the supported FFT sizes.

For example, in FIG. 2, sequence 1 and sequence 2 are length-127 sequences, and subcarrier spacing of 15 KHz could be employed. For UEs with wideband receivers, it may be desired that the overall PSS transmission bandwidth in terms of the number of subcarriers is close to 256 in order for the UEs to operate with a lower sampling rate of 3.84 MHz instead of 7.68 MHz. Without puncturing, only 2 subcarriers out of 256 subcarriers are available for guard subcarriers, which may not be enough for narrowband receiver operation. In one embodiment, sequence 2 is circularly mapped to subcarriers corresponding to edge subbands. Puncturing a few elements (e.g. 4) of sequence 2 on the side closer to sequence 1 can create an additional four guard subcarriers on each side of sequence 1. As a result, a total of ten guard subcarriers can exist between sequence 1 and sequence 2, five guard subcarriers per each side. In another example, sequence 2 may be truncated by eight elements (e.g., the last eight elements of sequence 2 is truncated), and the truncated sequence 2 of length-119 is mapped (e.g., circularly) to the subcarriers of the edge subbands, such that five guard subcarriers are present between sequence 1 and sequence 2 in each side of sequence 1.

In another embodiment, a BS (base station) employs one PSS sequence selected from a set of long PSS sequences, where each long PSS sequence of the set of long PSS sequences is based on, such as consisting of, multiple (e.g., m) short sequences of length $N_B$ and each short sequence is chosen to be either equal to or the complex-conjugate of a sequence from a set containing k (k is equal to or less than m) distinctive (no complex-conjugate sequences in the set, k can be equal to 1) length-$N_B$ sequences. The set (e.g., set size of 3) of long PSS sequences, each comprising m short sequences, can be constructed from k unique short sequences and their complex conjugates by placing the m short sequences in different orders or permuting the order of the m short sequences. Note that two of the m short sequences in a given PSS sequence can be complex conjugates of each other. As an example, one possible specific construction of each of the three long PSS sequences will be described next.

In one example, each length-N long PSS sequence out of the set of three long PSS sequences comprises of two length $N_B$ short sequences. Assuming the short sequences are ZC sequences of length $N_B$, then for each PSS sequence it could be beneficial to find two ZC roots or indices for the two ZC short sequences from the set of possible values of 1, 2, . . . , $N_B-1$. Hence, it could be beneficial to find a set containing three pairs of roots, each pair corresponding to one overall length N PSS sequence. Specifically, if we denote by $u_{i,j}$ the root of shorter length $N_B$ sequence j of overall sequence i, where i=1, 2, 3 and, j=1, 2, it would be beneficial to find the following set $\{(u_{1,1},u_{1,2}), (u_{2,1},u_{2,2}), (u_{3,1},u_{3,2})\}$. In one embodiment, a constraint on the roots is such that $u_{i,j}$~=$u_{k,j}$ for i~=k, and $u_{i,j}$~=$u_{i,k}$ for j~=k (~=means 'not equal to').

At least one exemplary embodiment includes the following structure for choosing the roots:

Given two non-equal roots $u_{1,1}$ and $u_{2,1}$, one example of the set for 3 PSS sequences can be given by $\{(u_{1,1}, N_B-u_{2,1}), (u_{2,1}, N_B-u_{1,1}), (N_B-u_{1,1}, u_{2,1})\}$. Note that ZC sequences of roots u and $N_B-u$ are complex conjugates. With these root indices, short sequence pairs corresponding to PSS sequences are of the form $\{(s1, s2^*), (s2, s1^*), (s1^*,s2)\}$, where s1 is a ZC sequence with the root index $u_{1,1}$, s2 is a ZC sequence with the root index $u_{2,1}$, and * denotes complex conjugation. In another example, a set with 4 PSS sequences can be given by $\{(u_{1,1}, N_B-u_{2,1}), (u_{2,1}, N_B-u_{1,1}), (N_B-u_{1,1}, u_{2,1}), \{(N_B-u_{2,1}, u_{1,1})\}$. With these root indices, short sequence pairs corresponding to PSS sequences are of the form $\{(s1, s2^*), (s2, s1^*), (s1^*,s2), (s2^*,s1)\}$, where s1 is a ZC sequence with the root index $u_{1,1}$, s2 is a ZC sequence with the root index $u_{2,1}$, and * denotes complex conjugation. With more number of sub-sequences and applying a similar principle, a PSS sequence set size can be readily extended to more than 4.

The proposed set of root pairs described above allows for UE detection complexity reduction. First of all, the UE only needs to save two sequence elements or the use of two sequence generators (e.g., corresponding to $u_{1,1}$ and $u_{2,1}$). Further, the multiplications used to calculate the correlations of the received signal against the three overall length N PSS sequences, can be computed using the multiplications of the received signal against the two short length $N_B$ sequences of roots $u_{1,1}$ and $u_{2,1}$, including any needed frequency shift multiplications of the received signal with each respective shorter sequences of roots $u_{1,1}$ and $u_{2,1}$. Since PSS detection complexity meaningfully impacts on the overall cell search complexity, in one embodiment, one PSS sequence (example, given by $(u_{1,1}, N_B-u_{1,1})$ or generally (u, $N_B-u$)), can be defined and no cell identity information may be carried by PSS, in order to reduce UE's PSS detection complexity. However, defining a single PSS sequence can limit coherent detection of SSS using channel estimates obtained from PSS, since the obtained channel estimates may not reflect a channel for a particular cell. With the proposed method to generate a set (set size of 3) of PSS sequences, UE can test 3 PSS sequences with detection complexity similar to 1 sequence detection and can still perform coherent detection of SSS with improved detection of SSS (and smaller ($\frac{1}{3}^{rd}$) possible hypothesis for SSS for the same number of physical cell-identities as for the one PSS sequence case).

Also, from a detection performance standpoint, using a concatenated structure can in fact provide meaningful performance enhancement over using long ZC sequences of length $N=2\times N_B$, as concatenation proves to be more robust against CFO. Roots $u_{1,1}$ and $u_{2,1}$ can be intelligently chosen to provide enhanced performance for band-limited UEs (of supported bandwidth around $N_B*SCS$) where a bandlimited UE may receive the portion of the sequence limited to the center, while at the same time, roots $u_{1,1}$ and $u_{2,1}$ selection can feature enhanced performance for wideband UEs, where UE can receive more of the overall sequence in a broader SS bandwidth to perform synchronization.

Figure 3:
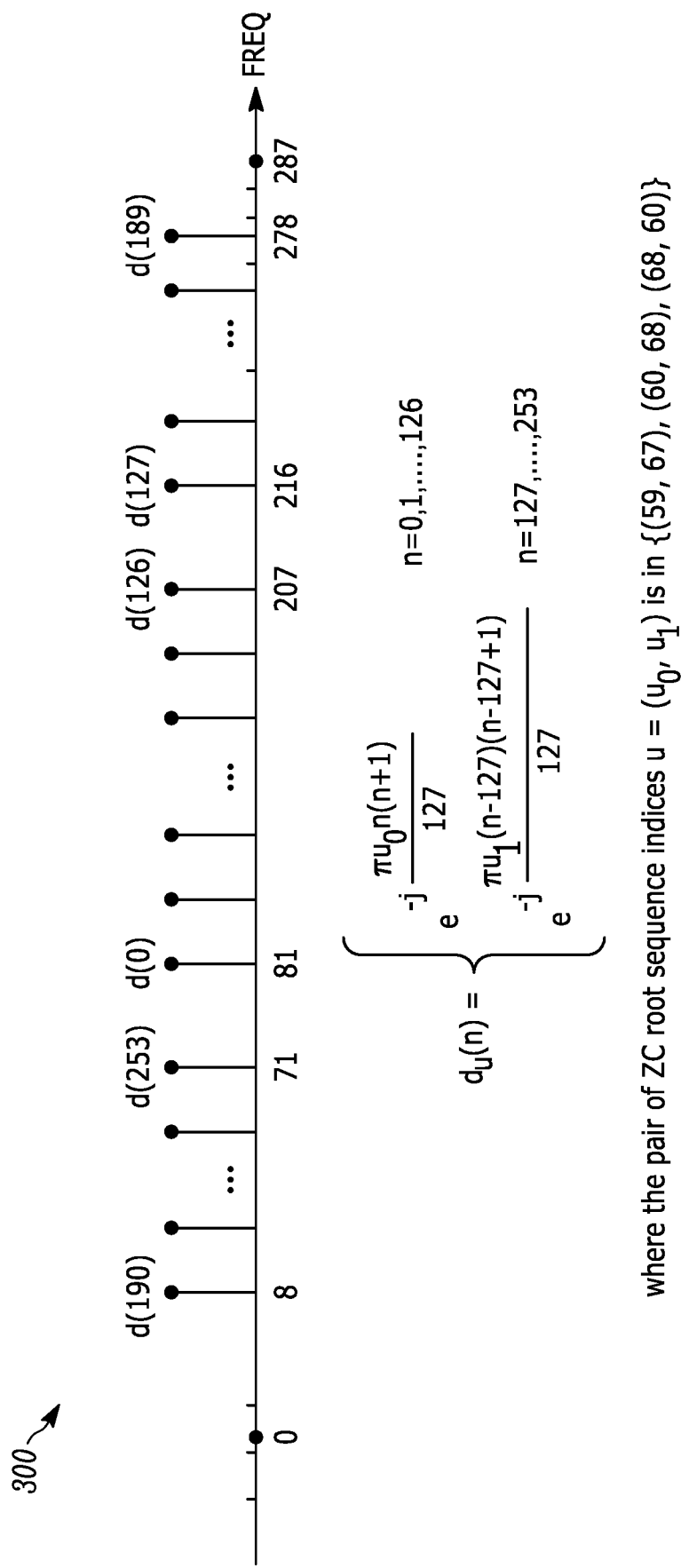
FIG. 3 is an exemplary primary synchronization signal sequence comprising of 2 length-127 sequences to subcarrier mapping.

Next, we present an example 300, illustrated in FIG. 3, where $N_B=127$ and PSS length, $m\times N_B$ (m=2), and when including sequence elements of value 0 corresponding to guard subcarriers (SCs) between the two length $N_B$ sequences (in the sequence to subcarrier mapping shown in the figure) the PSS length is N=271. In this example, PSS is generated including the root choices and sequence mapping to frequency. Auto-correlation and cross-correlation performances are presented and discussed.

In the example illustrated in FIG. 3, we define the following frequency domain ZC-based sequence according to:

$$d_u(n) = \begin{cases} e^{-j\frac{\pi u_0 n(n+1)}{127}} & n = 0, 1, \ldots, 126 \\ e^{-j\frac{\pi u_1(n-127)(n-127+1)}{127}} & n = 127, \ldots, 253 \end{cases}$$

where the pair of ZC root sequence indices $u=(u_0,u_1)$ is in $\{(59,67), (60,68), (68,60)\}$.

Note that the choices of $u_{1,1}=59$ and $u_{2,1}=60$ above are deliberately made so that the detection performance of band-limited UEs, which focus on the center sequence only, can be improved.

Figure 4:
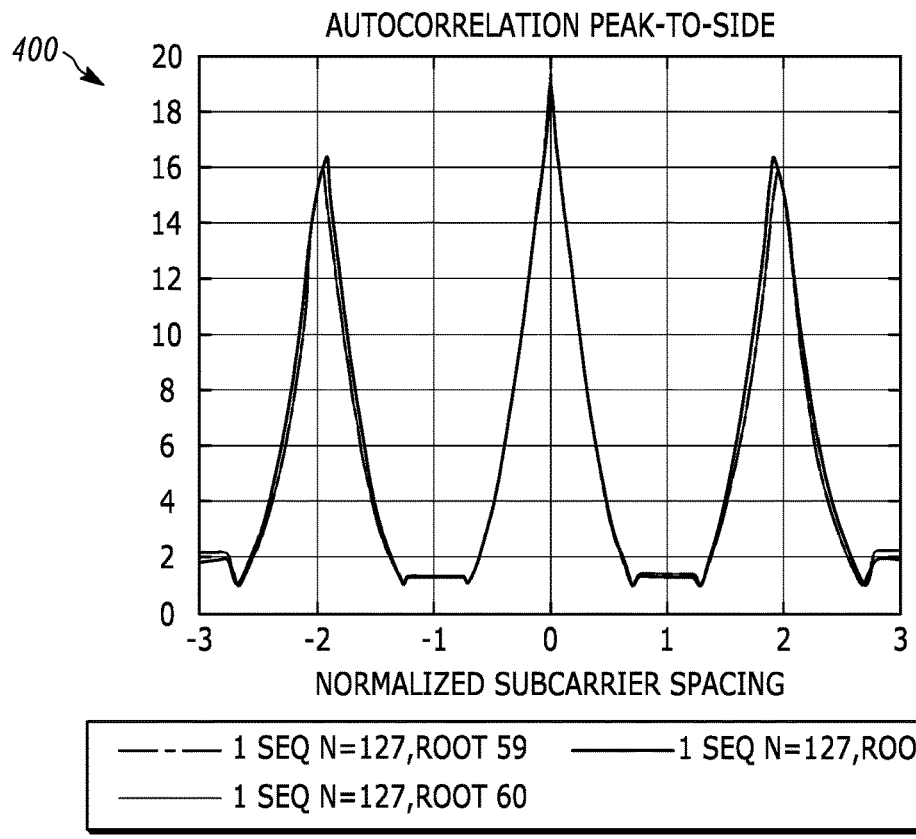
FIG. 4 is a graph of autocorrelation peak-to-side peak ratio (squared) as a function of frequency offset (in normalized subcarrier spacing) for a primary synchronization signal of length N=127 roots 59, 60, 68 and fast Fourier transform size 128.
Figure 6:
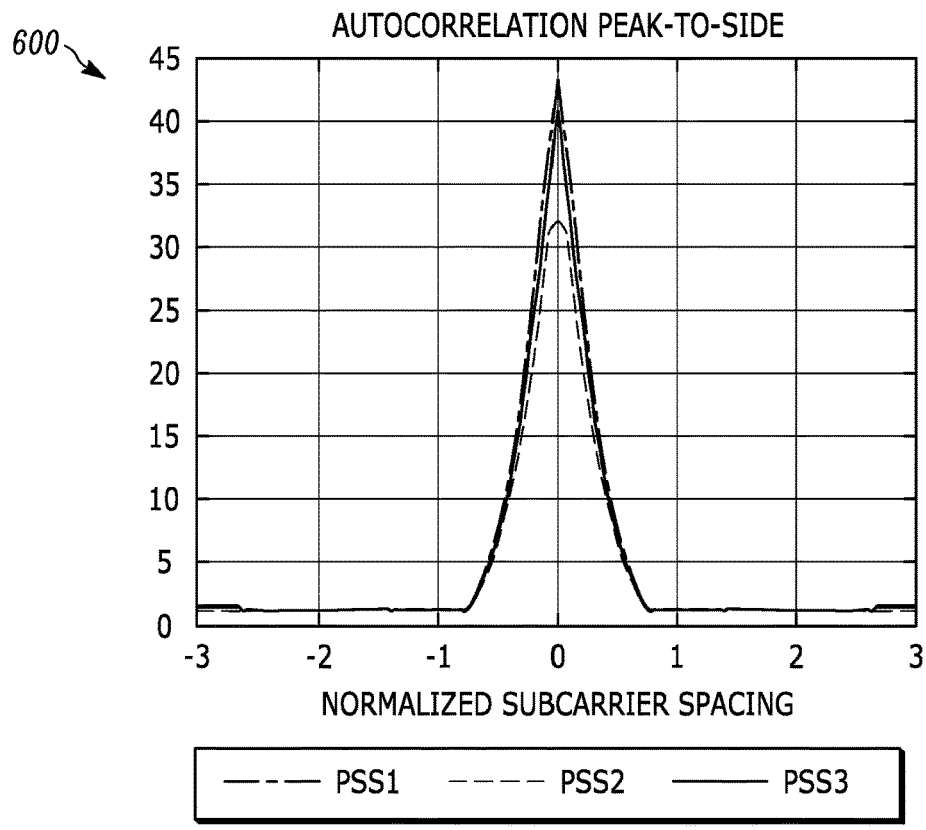
FIG. 6 is a graph of auto-correlation peak-to-side peak ratio (squared) as a function of frequency offset (in normalized subcarrier spacing) for the proposed primary synchronization signal structure of length N=271, roots $u_{1,1}=59$ and $u_{2,1}=60$, fast Fourier transform size 512 with decimation by a factor of 2.

By looking at examples 400 and 600 of FIG. 4 and FIG. 6, we can notice the meaningful enhancement in the auto-correlation function provided by the proposed PSS structure for N=271 compared to ZC of length N=127. Specifically, FIG. 4 and FIG. 6 present the autocorrelation peak to side peak ratio, which measures the strength of the autocorrelation function, versus frequency offset specified in normalized subcarrier (SC) spacing. We are mainly interested in the normalized SC spacing interval [−0.5, 0.5] because 5G RAT is expected to have carrier frequency of 4 GHz or higher and the SC spacing is expected to be at least 15 kHz or larger. Assuming frequency offset is uniformly distributed across +/−5 ppm of the 4 GHz carrier frequency, then the largest frequency offset in terms of normalized SC spacing is expected to be +/−(4/3) with 15 KHz subcarrier spacing. Using integer CFO estimation (i.e. estimation of a part of CFO corresponding to integer multiple of SCS) at the receiver, it suffices to look at the performance in the normalized SC spacing interval [−0.5, 0.5]. We can conclude by comparing FIG. 4 and FIG. 6 in the normalized SC spacing interval [−0.5, 0.5] that the proposed concatenated structure provides the needed enhancement in the autocorrelation function by going from 1 sequence with N=127 to the 2 sequence concatenation with N=271 (including guard SCs), despite the presence of CFO. In addition to that, from FIG. 4, we can confirm that the root choices provide enhanced performance for detection using just the center portion of the sequence.

Figure 5:
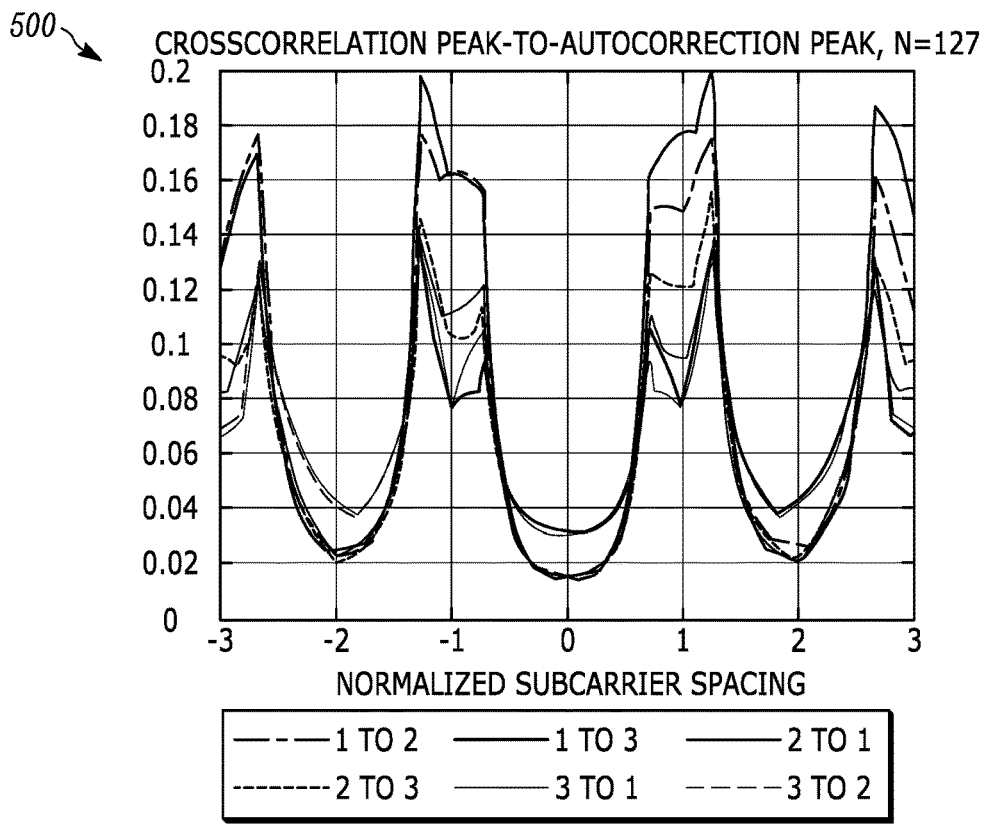
FIG. 5 is a graph of cross-correlation peak-to-autocorrelation peak ratio (squared) as a function of frequency offset (in normalized subcarrier spacing) between all three primary synchronization signals of length N=127, formed using roots 59, 60, 68 and a fast Fourier transform size of 128.
Figure 7:
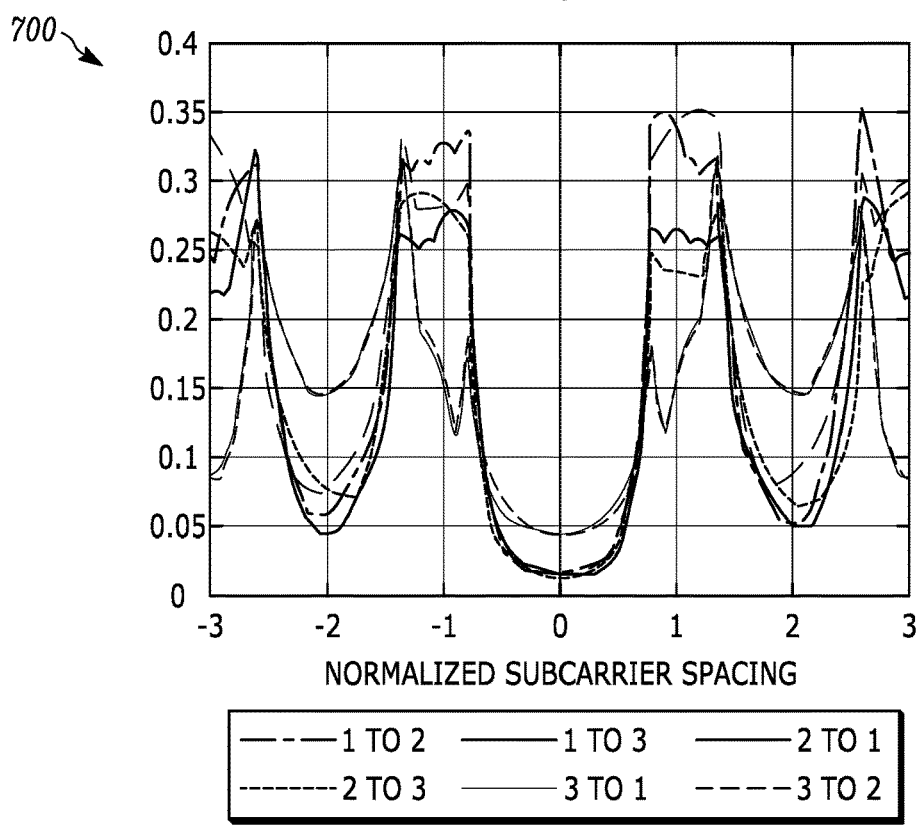
FIG. 7 is a graph of cross-correlation peak-to-autocorrelation peak ratio (squared) as a function of frequency offset (in normalized subcarrier spacing) for the proposed primary synchronization signal structure of length N=271, roots $u_{1,1}=59$ and $u_{2,1}=60$, fast Fourier transform size 512 with decimation by a factor of 2.
Figure 8:
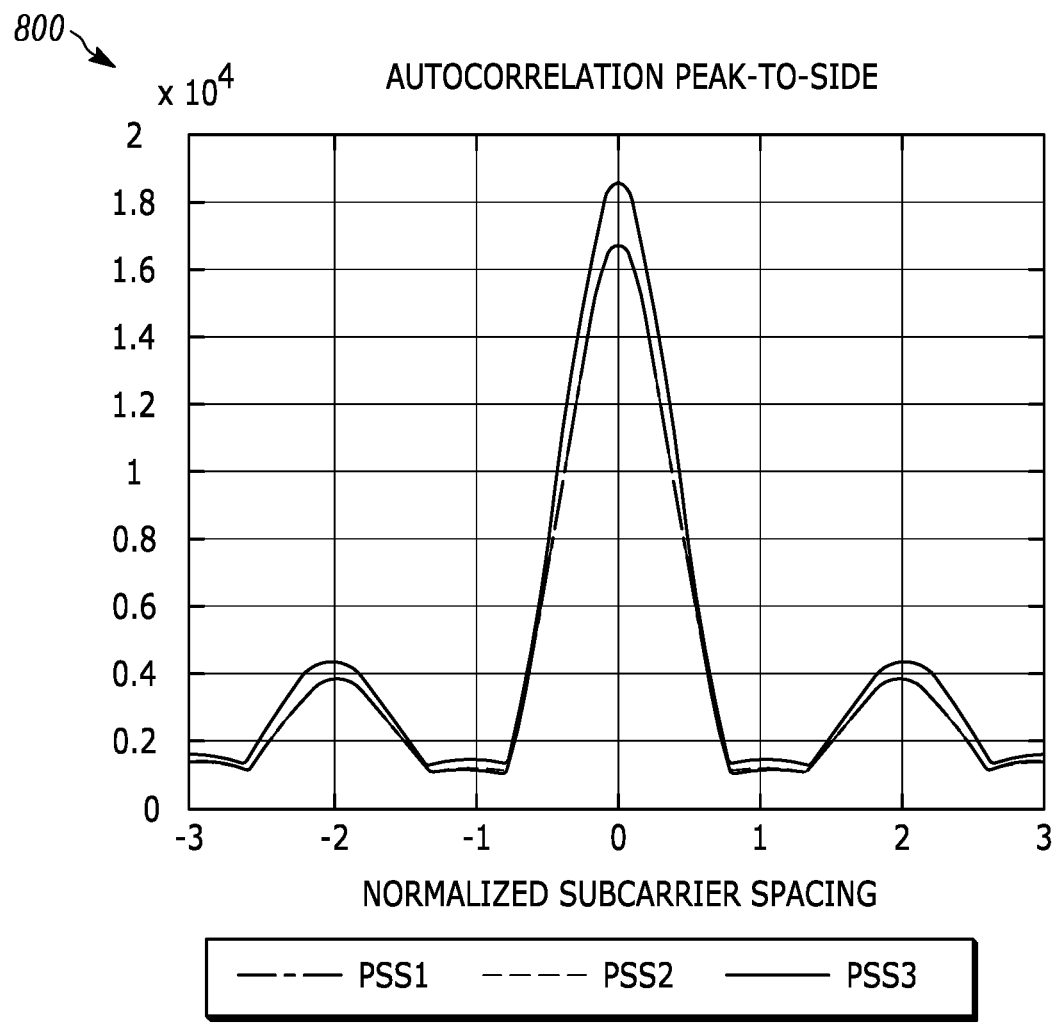
FIG. 8 is a graph of autocorrelation peak (squared) as a function of frequency offset (in normalized subcarrier spacing) for the proposed primary synchronization signal structure of length N=271, roots $u_{1,1}=59$ and $u_{2,1}=60$, fast Fourier transform size 512 with decimation by a factor of 2.

Now, we consider the cross-correlation performance between the three different PSS indices. From examples 500 and 700 of FIG. 5 and FIG. 7, in the normalized SC spacing interval [−0.5, 0.5], we can see that the N=271 proposed design has similar or slightly better cross-correlation peak to auto-correlation peak ratio than that for N=127. Note that for N=127, cross-correlation peak to autocorrelation peak also has improved performance which is due to the deliberate choice of the roots of the sequence in the center. This can be beneficial in the case that detection is performed by relying on the center sequence only. Lastly, we note that the slight increase in cross-correlation peak to autocorrelation peak in FIG. 7 in the intervals (−1.5,−0.7) and (0.7,1.5) should not be of concern, even in the presence of frequency offset of normalized SC spacing up to +/−(4/3), assuming integer CFO estimation (i.e. estimation of a part of CFO corresponding to integer multiple of SCS) is performed at the receiver. With compensation of a correct integer CFO (i.e. with an integer CFO hypothesis matched to the actual integer CFO), the residual CFO is within [−0.5, 0.5] SCS, and the example 800 of autocorrelation peak in [−0.5, 0.5] SCS shown in FIG. 8 is multiple folds larger than the largest cross-correlation peak at any CFO.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
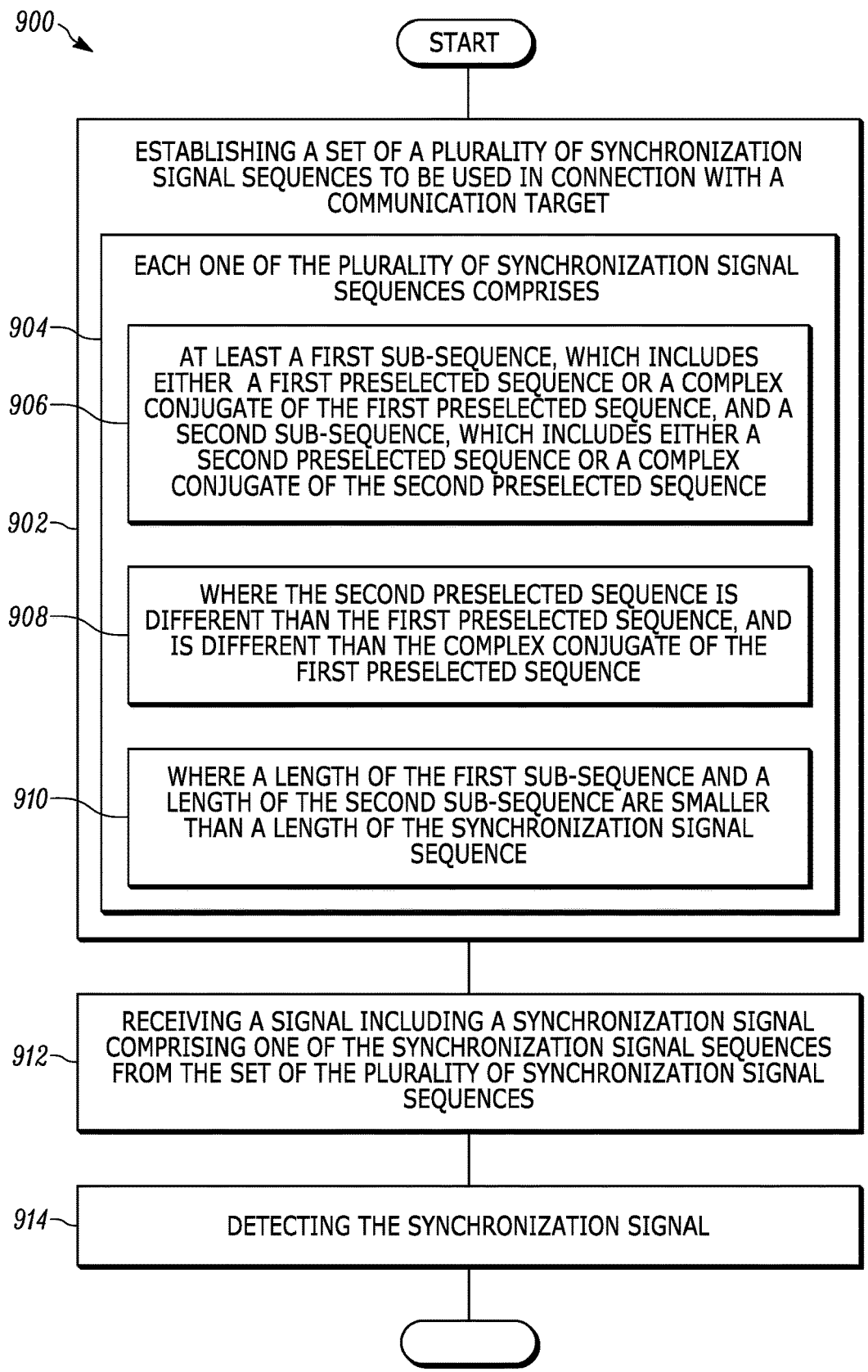
FIG. 9 is a flow diagram for receiving and detecting a synchronization signal in a user equipment having a synchronization signal sequence structure supporting low complexity cell detection, according to a possible embodiment.

FIG. 9 is a flow diagram 900 for receiving and detecting a synchronization signal in a user equipment having a synchronization signal sequence structure supporting low complexity cell detection, according to a possible embodiment. At 902, a set of a plurality of synchronization signal sequences is established, which is to be used in connection with a communication target. Each one of the plurality of synchronization signal sequences 904 comprises at least a first sub-sequence, which includes either a first preselected sequence or a complex conjugate of the first preselected sequence, and a second sub-sequence, which includes either a second preselected sequence or a complex conjugate of the second preselected sequence 906. The second preselected sequence is different than the first preselected sequence, and is different than the complex conjugate of the first preselected sequence 908. Further, a length of the first sub-sequence and a length of the second sub-sequence are smaller than a length of the synchronization signal sequence 910. A signal including a synchronization signal is then received 912, where the synchronization signal comprises one of the synchronization signal sequences from the set of the plurality of synchronization signal sequences, and the synchronization signal is then detected 914.

In at least some instances, a communication target can include a network comprising one or more network entities respectively associated with one or more communication areas, such as one or more cellular regions, and the user equipment communicates with the network via the one or more network entities, such as a base station, which could include an enhanced or a next generation nodeB. In the same or other instances, a communication target can include a direct communication connection with another user equipment. When the user equipment is communicating with a network entity, the detected synchronization signal could be used to identify at least a partial physical-layer cell identity of one of the one or more network entities.

As part of establishing 902 the set of the plurality of synchronization signal sequences, a predetermined set of the plurality of synchronization signal sequences could be generated. Furthermore, the first preselected sequence and the second preselected sequence could be established using Zadoff-Chu sequences, where each of the first and second sub-sequences uses a different Zadoff-Chu sequence root index. When establishing 902 the set of the plurality of synchronization signal sequences, a first one of the synchronization signal sequences from the set of the plurality of synchronization signal sequences could include the first sub-sequence being transmitted in a first set of subcarriers of a synchronization signal transmission band, and the second sub-sequence being transmitted in a second set of subcarriers of the synchronization signal transmission band. Further, a second one of the synchronization signal sequences from the set of the plurality of synchronization signal sequences could include the second sub-sequence being transmitted in the first set of subcarriers of the synchronization signal transmission band, and the first sub-sequence being transmitted in the second set of subcarriers of the synchronization signal transmission band. Still further, a third one of the synchronization signal sequences from the set of the plurality of synchronization signal sequences could include a complex conjugate of the first sub-sequence being transmitted in the first set of subcarriers of the synchronization signal transmission band, and a complex conjugate of the second sub-sequence being transmitted in the second set of subcarriers of the synchronization signal transmission band. A fourth one of the synchronization signal sequences from the set of the plurality of synchronization signal sequences could include the complex conjugate of the second sub-sequence being transmitted in the first set of subcarriers of the synchronization signal transmission band, and the complex conjugate of the first sub-sequence being transmitted in the second set of subcarriers of the synchronization signal transmission band.

In at least some instances, a transmission bandwidth of the synchronization signal in terms of a number of subcarriers could be set so as to be equal or close to a radix-2 fast Fourier transform size, or equal or close to a integer power of 2 number. Furthermore, one or more elements of at least one of the first and second sub-sequences could be punctured by the communication target when being used as part of a respective one of the synchronization signal sequences.

As part of detecting 914 the synchronization signal, the user equipment could compute cross-correlations between the received signal and the set of the plurality of synchronization signal sequences. Computing cross-correlations can include computing multiplications to calculate cross-correlations between the received signal and the set of the plurality of synchronization signal sequences, wherein the multiplications are at least in part based on multiplications of the received signal with a first portion of each respective one of the plurality of synchronization signal sequences in the set, which can correspond to the first preselected sequence, and multiplications of the received signal with a second portion of each respective one of the plurality of synchronization signal sequences in the set, which can correspond to the second preselected sequence. In one embodiment, computing cross-correlations are at least in part based on multiplications of the received signal with a first portion of each respective one of the plurality of synchronization signal sequences in the set, which can correspond to the first preselected sequence. In this embodiment, the second preselected sequence is not included in the computation of the cross-correlation.

Computing multiplications to calculate cross-correlations can also include using a frequency shift of multiplications of the received signal with the first portion of each respective one of the plurality of synchronization signal sequences in the set to calculate the cross-correlations between the received signal and the set of the plurality of synchronization signal sequences. Computing multiplications to calculate cross-correlations can also include using a frequency shift of multiplications of the received signal with the second portion of each respective one of the plurality of synchronization signal sequences in the set to calculate the cross-correlations between the received signal and the set of the plurality of synchronization signal sequences.

Figure 10:
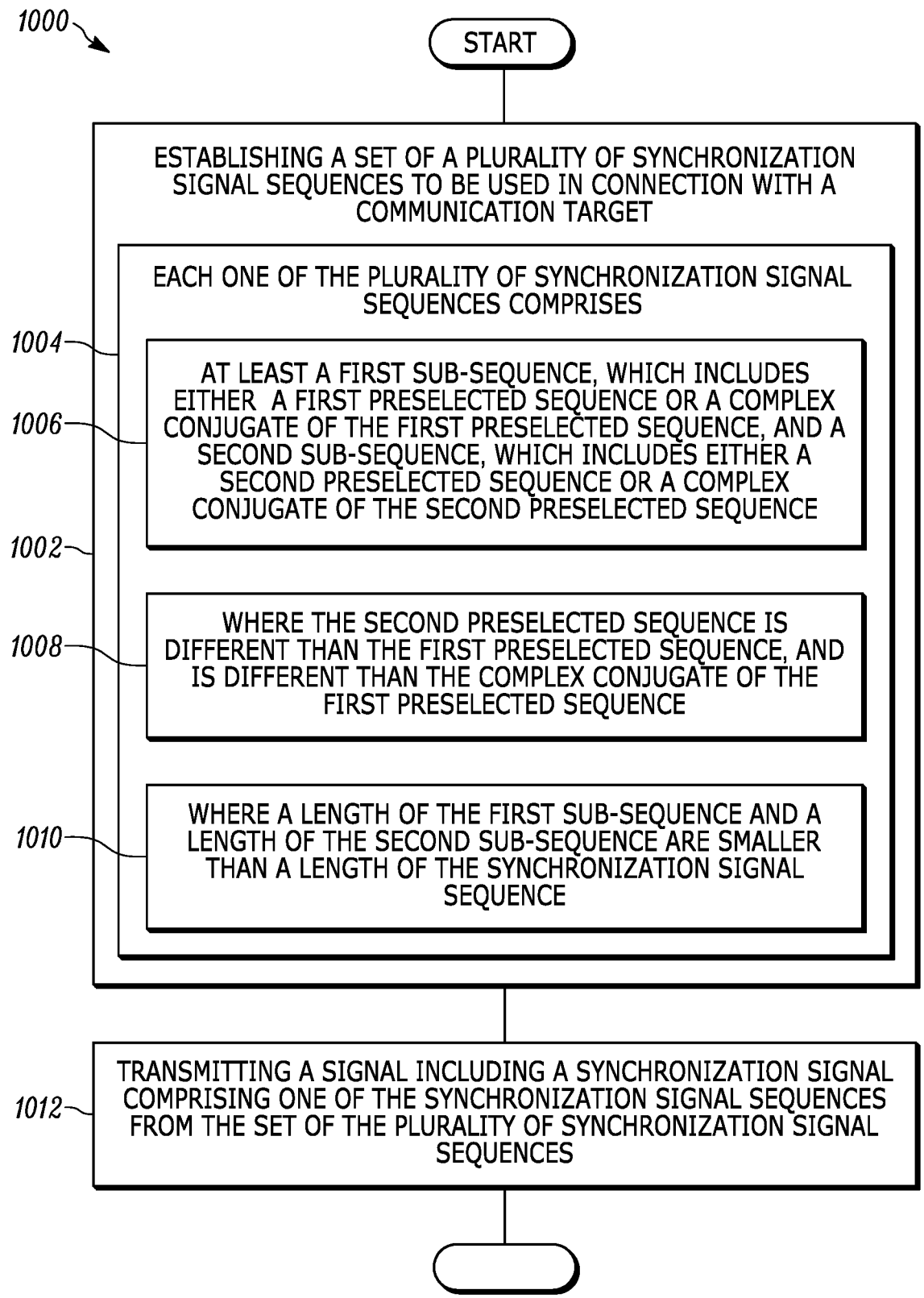
FIG. 10 is a flow diagram for transmitting a synchronization signal in a network entity having a synchronization signal sequence structure supporting low complexity cell detection, according to a possible embodiment.

FIG. 10 is a flow diagram 1000 for transmitting a synchronization signal in a network entity having a synchronization signal sequence structure supporting low complexity cell detection, according to a possible embodiment. Similar, to the flow diagram illustrated in FIG. 9, a set of a plurality of synchronization signal sequences is established 1002, which is to be used in connection with a communication target. Each one of the plurality of synchronization signal sequences 1004 comprises at least a first sub-sequence, which includes either a first preselected sequence or a complex conjugate of the first preselected sequence, and a second sub-sequence, which includes either a second preselected sequence or a complex conjugate of the second preselected sequence 1006. The second preselected sequence is different than the first preselected sequence, and is different than the complex conjugate of the first preselected sequence 1008. Further, a length of the first sub-sequence and a length of the second sub-sequence are smaller than a length of the synchronization signal sequence 1010. A signal including a synchronization signal is then transmitted 1012, where the synchronization signal comprises one of the synchronization signal sequences from the set of the plurality of synchronization signal sequences.

Figure 11:
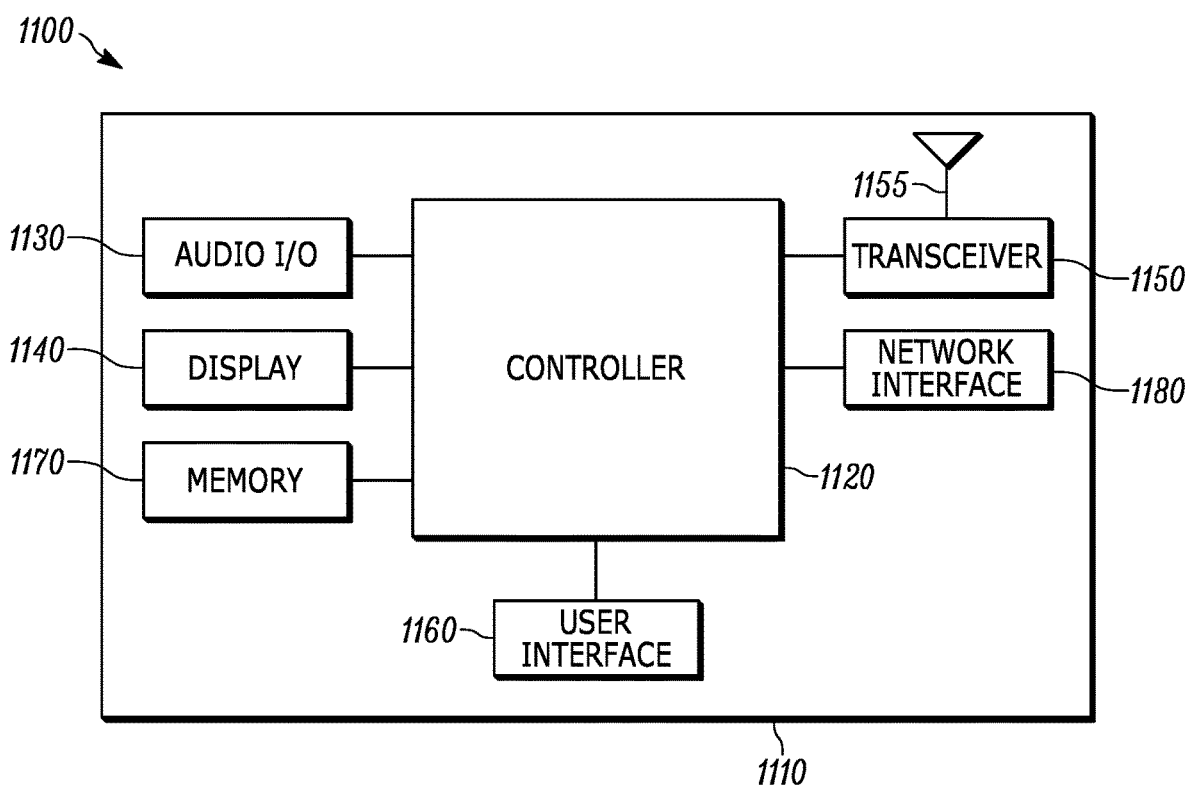
FIG. 11 is an example block diagram of an apparatus according to a possible embodiment.

FIG. 11 is an example block diagram of an apparatus 1100, such as the wireless communication device 110, according to a possible embodiment. The apparatus 1100 can include a housing 1110, a controller 1120 within the housing 1110, audio input and output circuitry 1130 coupled to the controller 1120, a display 1140 coupled to the controller 1120, a transceiver 1150 coupled to the controller 1120, an antenna 1155 coupled to the transceiver 1150, a user interface 1160 coupled to the controller 1120, a memory 1170 coupled to the controller 1120, and a network interface 1180 coupled to the controller 1120. The apparatus 1100 can perform the methods described in all the embodiments The display 1140 can be a viewfinder, a liquid crystal display (LCD), a light emitting diode (LED) display, a plasma display, a projection display, a touch screen, or any other device that displays information. The transceiver 1150 can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and an electronic device. The network interface 1180 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1170 can include a random access memory, a read only memory, an optical memory, a solid state memory, a flash memory, a removable memory, a hard drive, a cache, or any other memory that can be coupled to an apparatus.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1170 or elsewhere on the apparatus 1100. The apparatus 1100 or the controller 1120 may also use hardware to implement disclosed operations. For example, the controller 1120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1120 may be any controller or processor device or devices capable of operating an apparatus and implementing the disclosed embodiments. Some or all of the additional elements of the apparatus 1100 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment, the method comprising:
   establishing a set of a plurality of synchronization signal sequences, where each of the synchronization signal sequences from the set is to be used in connection with a different one of potential respective communication targets, and where each one of the plurality of synchronization signal sequences comprises
      at least a first sub-sequence, which includes either a first preselected sequence or a complex conjugate of the first preselected sequence, and a second sub-sequence, which includes either a second preselected sequence or a complex conjugate of the second preselected sequence,
      where the second preselected sequence is different than the first preselected sequence, and is different than the complex conjugate of the first preselected sequence, and
      where a length of the first sub-sequence and a length of the second sub-sequence are smaller than a length of the synchronization signal sequence, and the length of the first sub-sequence is the same as the length of the second sub-sequence;
   receiving a signal including a synchronization signal, where the synchronization signal comprises one of the synchronization signal sequences from the set of the plurality of synchronization signal sequences; and
   detecting a particular one of the synchronization signal sequences of the set of the plurality of synchronization signal sequences for use in identifying a particular one of the potential respective communication targets.

2. A method in accordance with claim 1, wherein the potential respective communication targets include a network comprising one or more network entities respectively associated with one or more communication areas, and the user equipment communicates with the network via the one or more network entities.

3. A method in accordance with claim 2, further comprising using the detected synchronization signal to identify at least a partial physical-layer cell identity of one of the one or more network entities.

4. A method in accordance with claim 1, wherein the potential respective communication targets include a direct communication connection with another user equipment.

5. A method in accordance with claim 1, wherein establishing the set of the plurality of synchronization signal sequences includes generating a predetermined set of the plurality of synchronization signal sequences.

6. A method in accordance with claim 1, wherein the first preselected sequence and the second preselected sequence are Zadoff-Chu sequences, where each of the first and second sub-sequences uses a different Zadoff-Chu sequence root index.

7. A method in accordance with claim 1, wherein detecting the particular one of the synchronization signal sequences includes computing cross-correlations between the received signal and the set of the plurality of synchronization signal sequences.

8. A method in accordance with claim 7, wherein computing cross-correlations includes computing multiplications to calculate cross-correlations between the received signal and the set of the plurality of synchronization signal sequences, wherein the multiplications are at least in part based on multiplications of the received signal with a first portion of each respective one of the plurality of synchronization signal sequences in the set, which corresponds to the first preselected sequence, and multiplications of the received signal with a second portion of each respective one of the plurality of synchronization signal sequences in the set, which corresponds to the second preselected sequence.

9. A method in accordance with claim 8, wherein computing multiplications to calculate cross-correlations includes using a frequency shift of multiplications of the received signal with the first portion of each respective one of the plurality of synchronization signal sequences in the set to calculate the cross-correlations between the received signal and the set of the plurality of synchronization signal sequences.

10. A method in accordance with claim 8, wherein computing multiplications to calculate cross-correlations includes using a frequency shift of multiplications of the received signal with the second portion of each respective one of the plurality of synchronization signal sequences in the set to calculate the cross-correlations between the received signal and the set of the plurality of synchronization signal sequences.

11. A method in accordance with claim 1, wherein a first one of the synchronization signal sequences from the set of the plurality of synchronization signal sequences comprises the first sub-sequence being transmitted in a first set of subcarriers of a synchronization signal transmission band, and the second sub-sequence being transmitted in a second set of subcarriers of the synchronization signal transmission band.

12. A method in accordance with claim 11, wherein a second one of the synchronization signal sequences from the set of the plurality of synchronization signal sequences comprises the second sub-sequence being transmitted in the first set of subcarriers of the synchronization signal transmission band, and the first sub-sequence being transmitted in the second set of subcarriers of the synchronization signal transmission band.

13. A method in accordance with claim 12, wherein a third one of the synchronization signal sequences from the set of the plurality of synchronization signal sequences comprises a complex conjugate of the first sub-sequence being transmitted in the first set of subcarriers of the synchronization signal transmission band, and a complex conjugate of the second sub-sequence being transmitted in the second set of subcarriers of the synchronization signal transmission band, and a fourth one of the synchronization signal sequences from the set of the plurality of synchronization signal sequences comprises the complex conjugate of the second sub-sequence being transmitted in the first set of subcarriers of the synchronization signal transmission band, and the complex conjugate of the first sub-sequence being transmitted in the second set of subcarriers of the synchronization signal transmission band.

14. A method in accordance with claim 1, wherein one or more elements of at least one of the first and second sub-sequences are punctured by the communication target when used as part of a respective one of the synchronization signal sequences.

15. A method in accordance with claim 1, wherein a transmission bandwidth of the synchronization signal in terms of a number of subcarriers is equal to a radix-2 fast Fourier transform size.

16. A user equipment in a communication network including one or more potential respective communication targets from which a synchronization signal can be received, the user equipment comprising:

a controller that establishes a set of a plurality of synchronization signal sequences, where each of the synchronization signal sequences from the set is to be used in connection with a different one of the potential respective communication targets, and where each one of the plurality of synchronization signal sequences comprises at least a first sub-sequence, which includes either a first preselected sequence or a complex conjugate of the first preselected sequence, and a second sub-sequence, which includes either a second preselected sequence or a complex conjugate of the second preselected sequence, where the second preselected sequence is different than the first preselected sequence, and is different than the complex conjugate of the first preselected sequence, and where a length of the first sub-sequence and a length of the second sub-sequence are smaller than a length of the synchronization signal sequence, and the length of the first sub-sequence is the same as the length of the second sub-sequence; and a transceiver that receives a signal including a synchronization signal, where the synchronization signal comprises one of the synchronization signal sequences from the set of the plurality of synchronization signal sequences; and wherein the controller further detects a particular one of the synchronization signal sequences of the set of the plurality of synchronization signal sequences for use in identifying a particular one of the potential respective communication targets.

17. A user equipment in accordance with claim 16, wherein the potential respective communication targets include a network comprising one or more network entities respectively associated with one or more communication areas, and the user equipment communicates with the network via the one or more network entities.

18. A user equipment in accordance with claim 17, wherein the controller uses the detected synchronization signal to identify at least a partial physical-layer cell identity of one of the one or more network entities.

19. A user equipment in accordance with claim 16, wherein the potential respective communication targets include a direct communication connection with another user equipment.

20. A user equipment in accordance with claim 16, wherein the first preselected sequence and the second preselected sequence used by the controller to establish a set of a plurality of synchronization signal sequences are Zadoff-Chu sequences, where each of the first and second preselected sequences uses a different Zadoff-Chu sequence root index.

* * * * *